US011859444B1

(12) United States Patent
McSparrin

(10) Patent No.: US 11,859,444 B1
(45) **Date of Patent: *Jan. 2, 2024**

(54) HEADER ASSEMBLY AND METHOD FOR INSTALLING RETRACTABLE SCREENS

(71) Applicant: MDM Enterprises, Inc., Edmond, OK (US)

(72) Inventor: Michael D. McSparrin, Stillwater, OK (US)

(73) Assignee: MDM ENTERPRISES, INC., Edmond, OK (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/218,744

(22) Filed: Dec. 13, 2018

Related U.S. Application Data

(60) Continuation of application No. 15/201,408, filed on Jul. 2, 2016, now Pat. No. 10,190,365, which is a division of application No. 14/688,588, filed on Apr. 16, 2015, now Pat. No. 10,017,983.

(60) Provisional application No. 61/982,232, filed on Apr. 21, 2014.

(51) Int. Cl.

| | |
|---|---|
| ***E06B 9/42*** | (2006.01) |
| ***E06B 9/17*** | (2006.01) |
| *E06B 9/58* | (2006.01) |

(52) U.S. Cl.
CPC ........ *E06B 9/17007* (2013.01); *E06B 9/1703* (2013.01); *E06B 9/42* (2013.01); *E06B 9/17023* (2013.01); *E06B 9/581* (2013.01)

(58) Field of Classification Search
CPC ...... E06B 9/17; E06B 9/1703; E06B 9/17007; E06B 9/17023; E06B 9/42; E06B 9/581; E06B 1/6023; E06B 2009/005; E06B 3/4423; E04F 2/72
See application file for complete search history.

(56) References Cited

U.S. PATENT DOCUMENTS

| | | | | |
|---|---|---|---|---|
| 1,002,360 A * | 9/1911 | Bauer | E06B 9/52 | 160/392 |
| 1,233,658 A * | 7/1917 | Forner | E06B 9/581 | 160/273.1 |
| 1,349,438 A * | 8/1920 | Samplawski | E06B 9/54 | 160/100 |
| 2,379,120 A * | 6/1945 | Turner | E06B 9/54 | 160/27 |

(Continued)

*Primary Examiner* — Abe Massad
(74) *Attorney, Agent, or Firm* — Mary M. Lee

(57) ABSTRACT

A header assembly and method for installing built-in retractable screens. A header assembly is installed after the structure's framing is completed but before the wall finishes are applied. The header assembly includes opposing end boxes and a header board. The side tracks from the screen unit are installed so that the upper ends open into the bottom of the end boxes. This defines a cavity customized to the selected screen unit. With the header assembly and side tracks in place, the wall surfaces can be applied around them. After the wall surfaces are completed, the screen unit is placed inside the header assembly through an access opening, which is then covered with a cover panel. Thus, the present invention eliminates the need to apply wall finishes around an undefined space, which requires multiple measurements and often results in expensive mistakes in the finished cavity dimensions.

12 Claims, 11 Drawing Sheets

(56) References Cited

U.S. PATENT DOCUMENTS 2,432,808 A * 12/1947 Royak ........................ E06B 9/54 160/27
3,158,195 A * 11/1964 Ney ........................ E06B 9/54 160/26
3,173,474 A * 3/1965 Wootten .................... E06B 9/54 160/27
3,292,685 A * 12/1966 Clark ........................ E06B 9/13 160/26
3,658,111 A * 4/1972 Herms ................ E06B 9/17015 160/26
4,197,896 A * 4/1980 Reichstadt .......... E06B 9/17023 160/107
4,399,855 A * 8/1983 Volfson ..................... E06B 9/11 160/23.1
5,117,893 A * 6/1992 Morrison .................. E06B 9/86 160/133
5,323,831 A * 6/1994 Manthei .................. E06B 9/581 160/23.1
5,492,163 A * 2/1996 Allendorfer ........ E06B 9/17007 160/133
6,167,936 B1 * 1/2001 Stover ....................... E06B 9/54 160/100
6,415,845 B2 * 7/2002 Cattaneo ............. E06B 9/17061 160/323.1
8,887,789 B2 * 11/2014 Tremaine, III ....... E06B 9/0692 160/273.1
9,428,955 B2 * 8/2016 Fleischman ......... E04F 10/0607
2007/0284053 A1 * 12/2007 Mullet ...................... E06B 9/42 160/31
2009/0065156 A1 * 3/2009 Roberts ................... E06B 9/581 160/266
2013/0068398 A1 * 3/2013 Wills .................. E06B 9/17007 160/26
2017/0159352 A1 * 6/2017 Cooper ..................... E06B 9/58

* cited by examiner

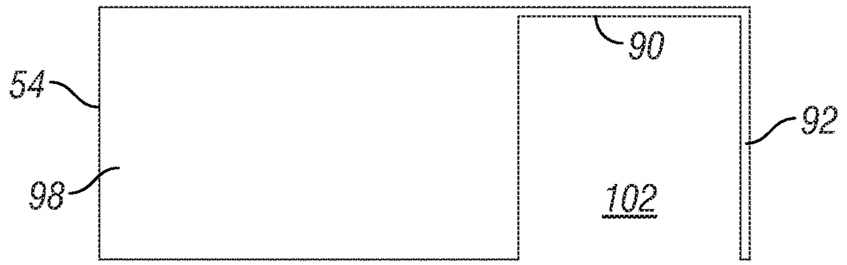
FIG. 8
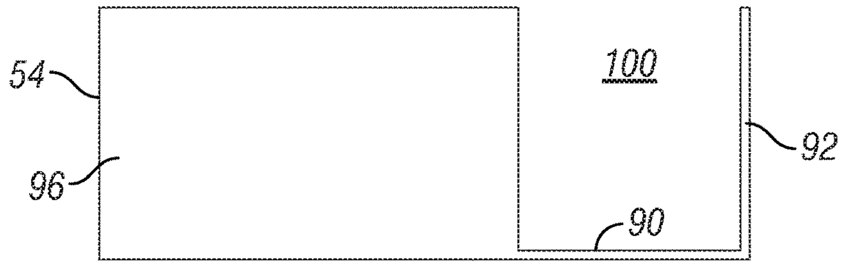
FIG. 9
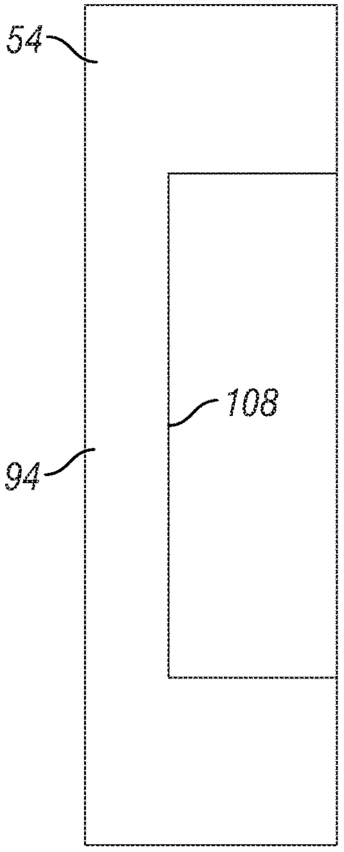
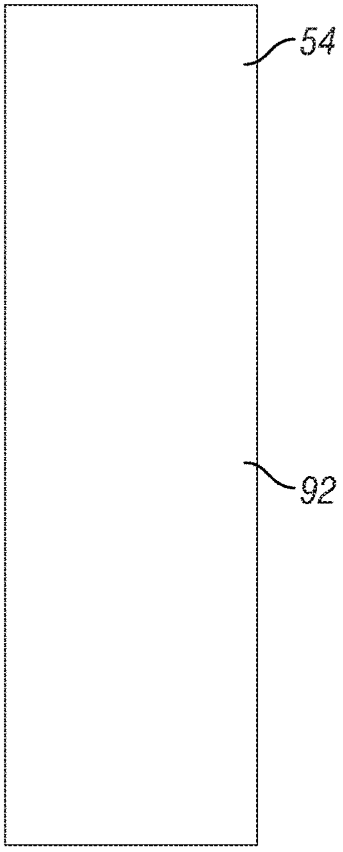
FIG. 10
FIG. 11

HEADER ASSEMBLY AND METHOD FOR INSTALLING RETRACTABLE SCREENS

CROSS-REFERENCE TO RELATED APPLICATIONS

This application is a continuation of U.S. patent application Ser. No. 15/201,408, entitled "Header Assembly and Method for Installing Retractable Screen," filed Jul. 2, 2016, which is a divisional of U.S. patent application Ser. No. 14/688,588, entitled "Header Assembly and Method for Installing Retractable Screen," filed Apr. 16, 2015, now U.S. Pat. No. 10,017,983, granted Jul. 10, 2018, which application claims the benefit of U.S. provisional application No. 61/982,232, entitled "Method and System for Installing Retractable Screen," filed Apr. 21, 2014, the contents of which are incorporated herein by reference.

FIELD OF THE INVENTION

The present invention relates to retractable screens generally and, more particularly but without limitation, to methods and devices for installing retractable screens.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 8 is a plan view of the end box shown in FIG. 6.

FIG. 9 is a bottom elevational view of the end box shown in FIG. 6.

FIG. 10 is a front elevational view of the end box shown in FIG. 6.

FIG. 11 is a back or rear elevational view of the end box shown in FIG. 6.

DETAILED DESCRIPTION OF THE PREFERRED EMBODIMENT(S)

Built-in retractable screens are becoming increasingly popular in both residential and commercial buildings. Installation of retractable screens preferably is done during the original construction and requires coordination between the builder and the screen installer. Once a specific screen product is selected, the dimensions required for the screen and header assembly is provided by the screen installer to the builder. Then, the builder constructs the frame and attempts to install the masonry or woodwork leaving cavities of the specified dimensions for later installation of the screen components. This allows opportunity for error in the communication of the dimensions as well as adherence of the dimensions by the various workmen who install the masonry or woodwork wall surfaces. The present invention provides a custom cavity system that simplifies the installation process and reduces the likelihood of errors during the construction of the framework and wall surfaces.

Figure 1:
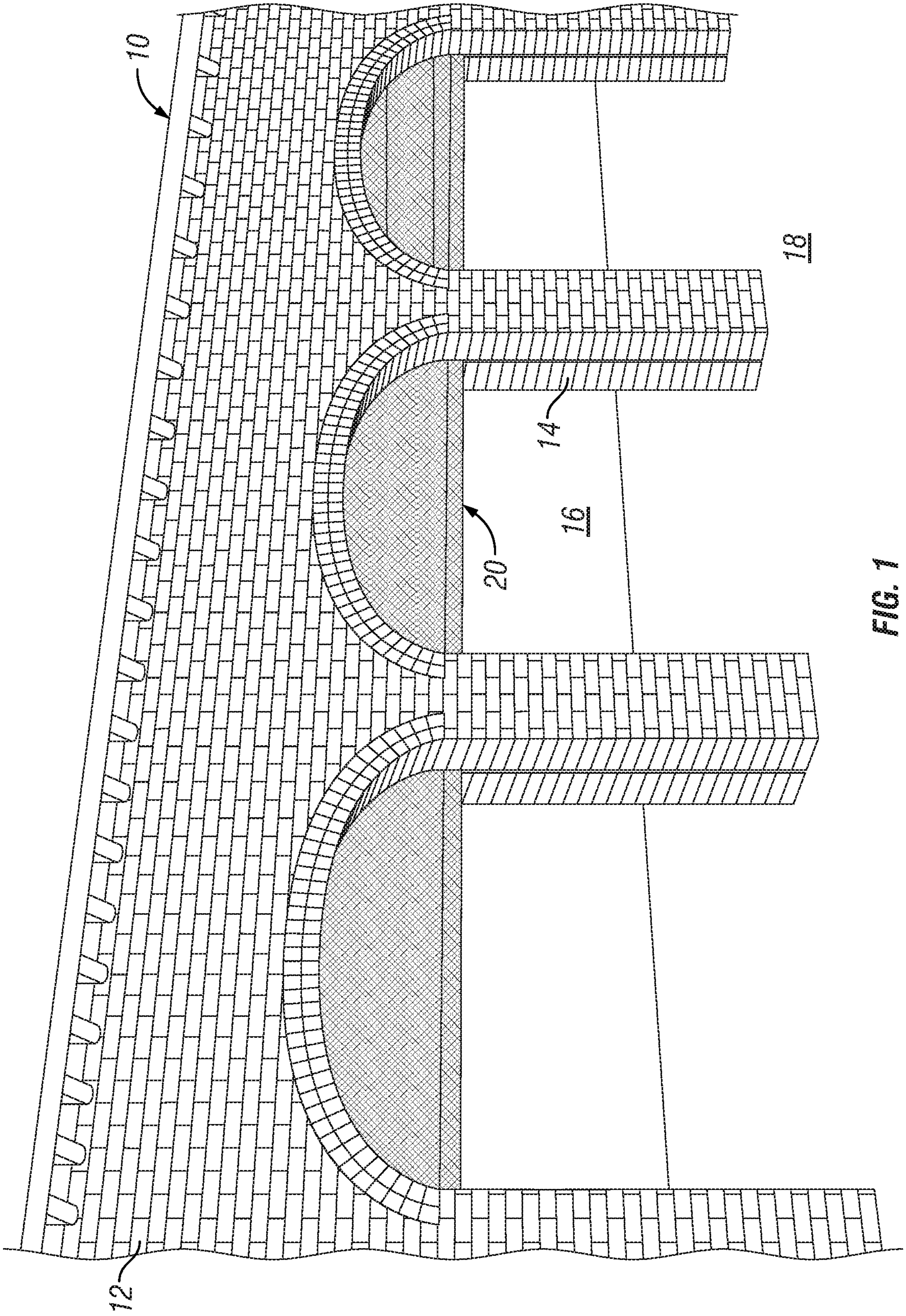
FIG. 1 is a perspective view of the outside of a building with multiple large arched openings connecting an interior space behind the arched openings with an open patio outside. Retractable screens are installed in each of the arched openings.
Figure 2:
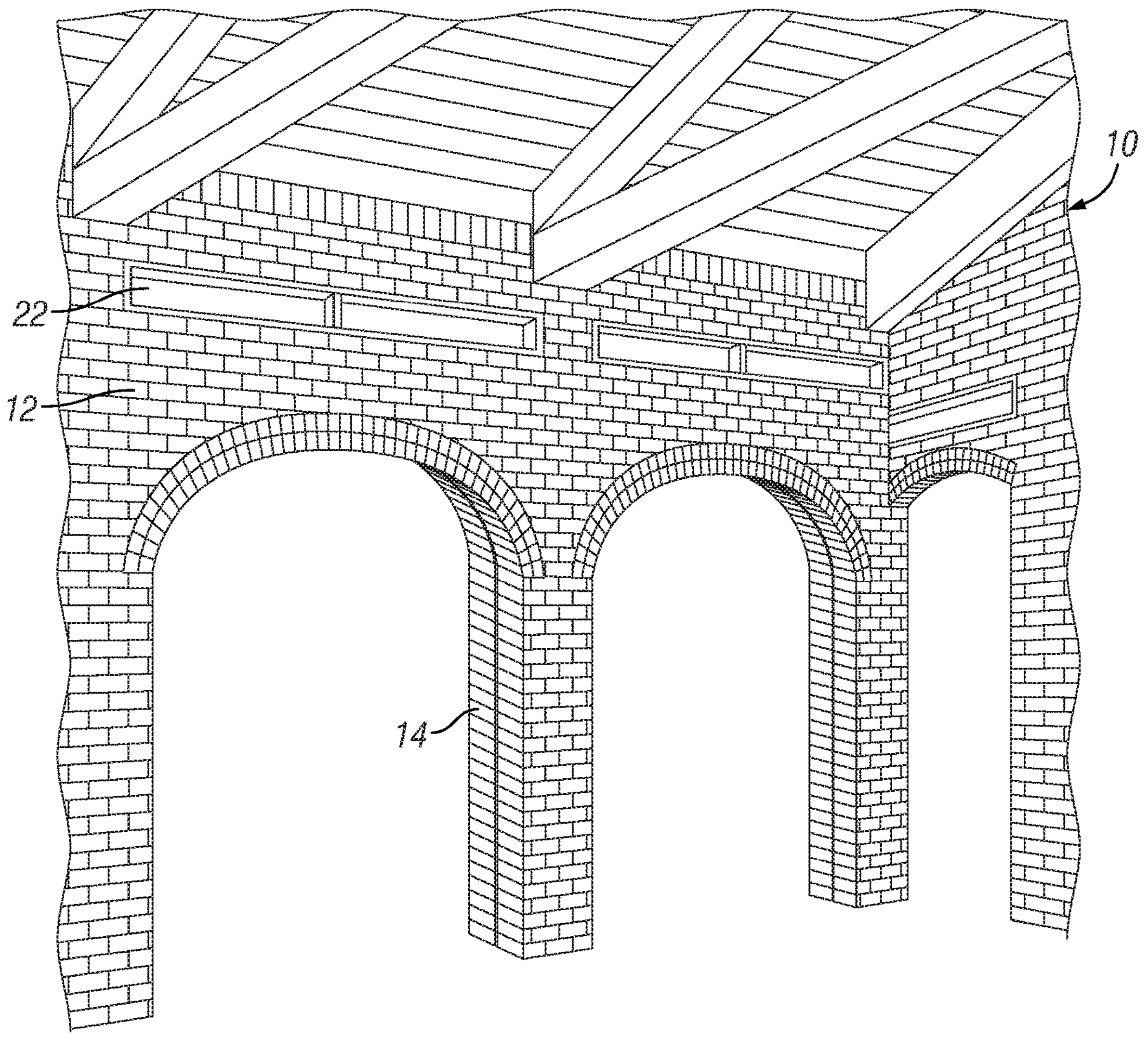
FIG. 2 is perspective view from the inside of the building shown in FIG. 1. The retractable screen, including the header mechanism, is omitted to reveal the access opening to the screen header assembly of the present invention.

Turning now to the drawings in general and to FIGS. 1 and 2 in particular, there is shown therein a building structure, designated generally by the reference number 10. The wall 12 of the building 10 has several multiple large arched openings, one of which is designated at 14. These arched opening connect an inside space 16, such as a lanai, with an outside space 18, such as a patio, as shown in FIG. 1. FIG. 1 illustrates the built-in retractable screens 20 installed and partially lowered. As explained above, when the wall surfaces are applied to the frame, a screen cavity of specified dimensions is provided inside the wall 12 to receive the retractable screen unit 20. As shown in FIG. 2, an access opening 22 is left, usually in the interior wall surface, to install the screen unit 20 (FIG. 1) in the screen cavity and thereafter to access the screen unit for maintenance and repair.

Figure 3:
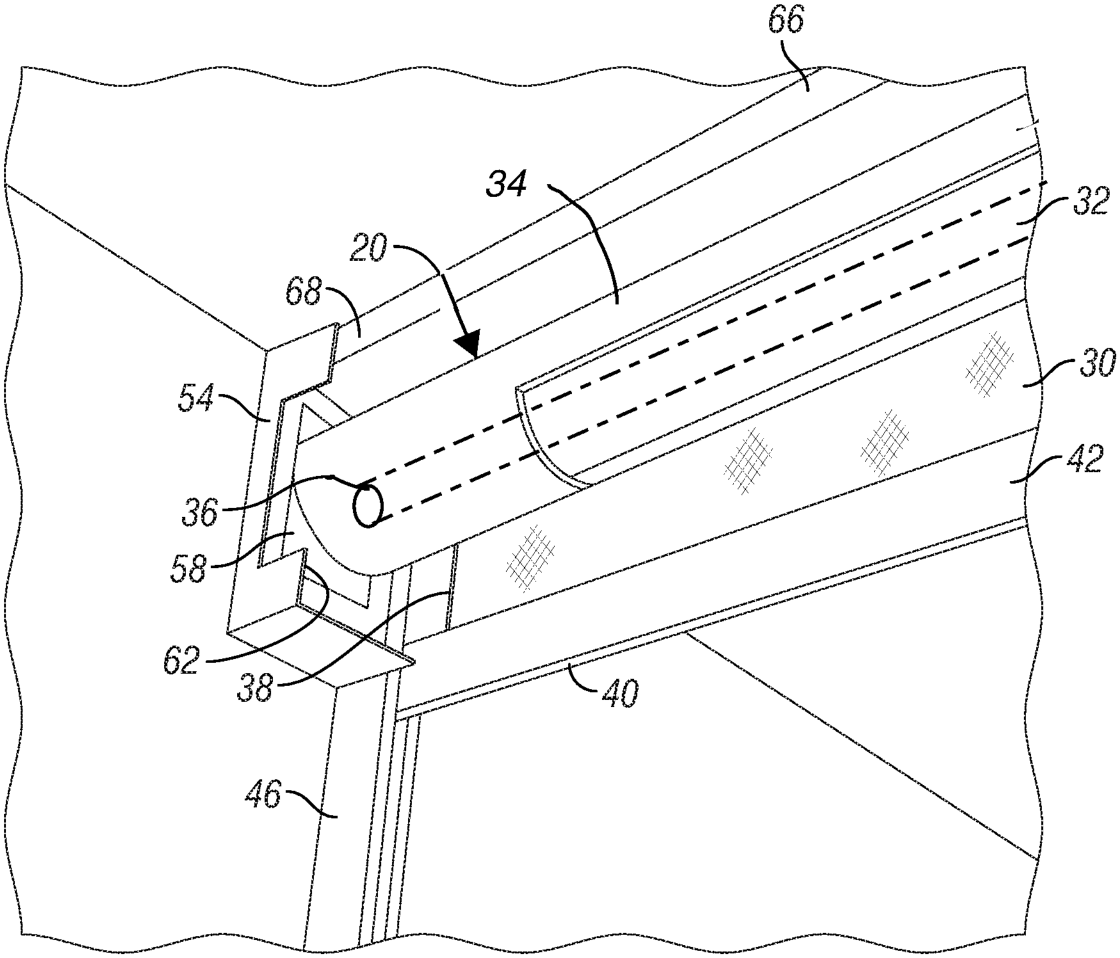
FIG. 3 is an enlarged, fragmented, perspective view of the installed header assembly with the screen unit installed. The interior wall finishes are omitted to simplify the illustration.

The header assembly and method of the present invention is designed for use with conventional screen units. FIG. 3 illustrates a typical screen unit 20 installed in a header assembly made in accordance with the present invention. As both ends of the screen unit 20 are similar, only one end is shown and described here. The screen unit 20 generally comprises a retractable screen panel 30 deployable from a roll 32 inside an elongate magazine or housing 34. The roll 32 has first and second ends. Only the first end 36 is shown in the fragmented view of FIG. 3.

The screen panel 30 has first and second side edges. Only the first side edge 38 is shown. The bottom of the screen panel 30 terminates in a leading or bottom edge 40, which is usually provided with a weighted slidebar 42. The screen unit 20 includes first and second vertical side tracks 46 and 48 (see also FIGS. 4&5). Each track 46 and 48 has a forwardmost surface 46*b* and 48*b* that defines a vertical slot to receive one of the first and second side edges of the screen panel when the screen unit is installed in the structure to receive. Thus, the side tracks 46 and 48 guide and stabilize the side edges 38 of the screen panel 30 as it is raised and lowered. The screen unit 20 may be one of an assortment of stock sizes or it may be custom made to the designer's specifications.

Figure 4:
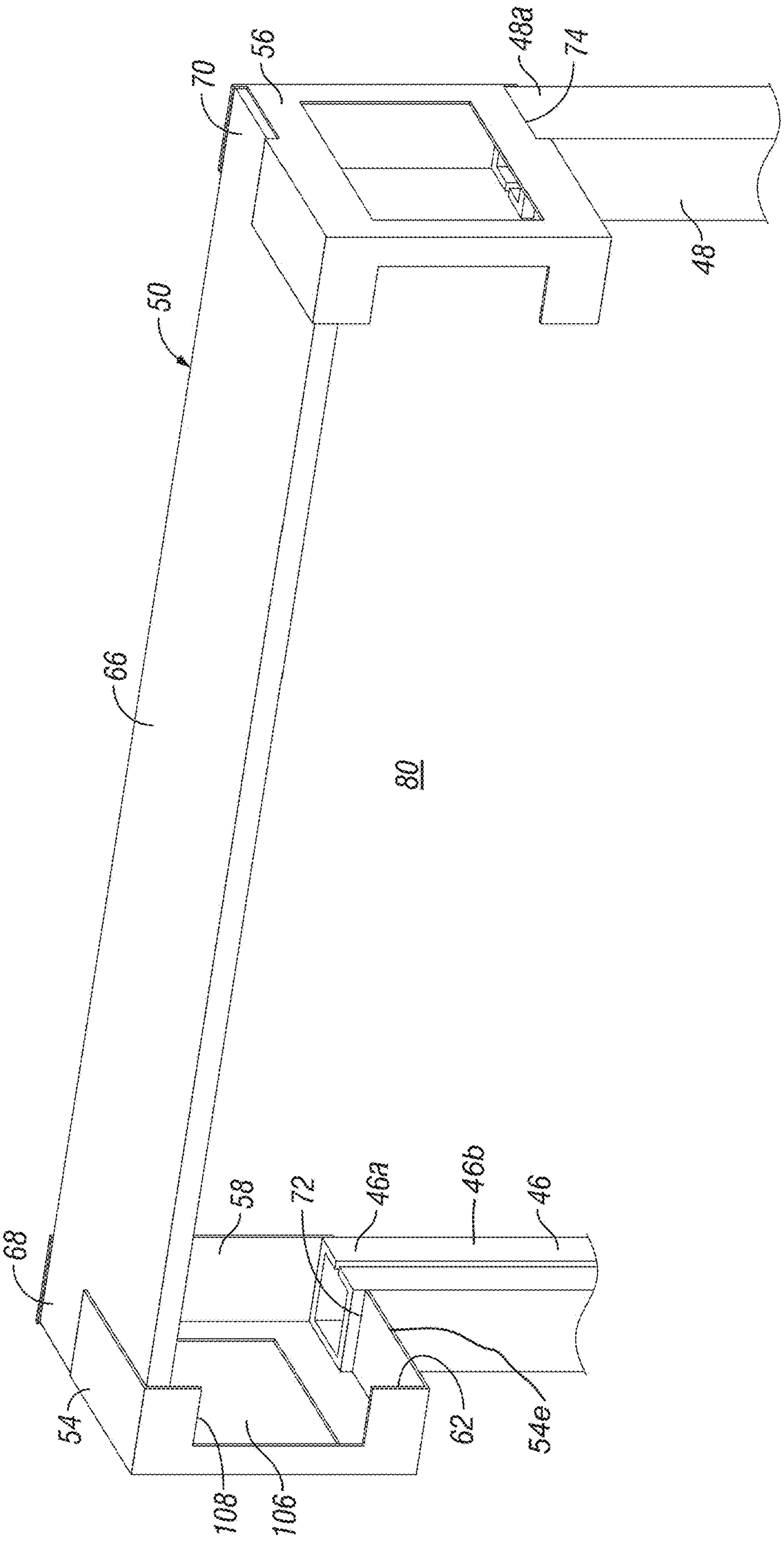
FIG. 4 is an enlarged, fragmented, left perspective view of the header assembly shown in the installed or assembled form viewed from the inside of the building. The surrounding building structure is omitted to simplify the illustration.
Figure 5:
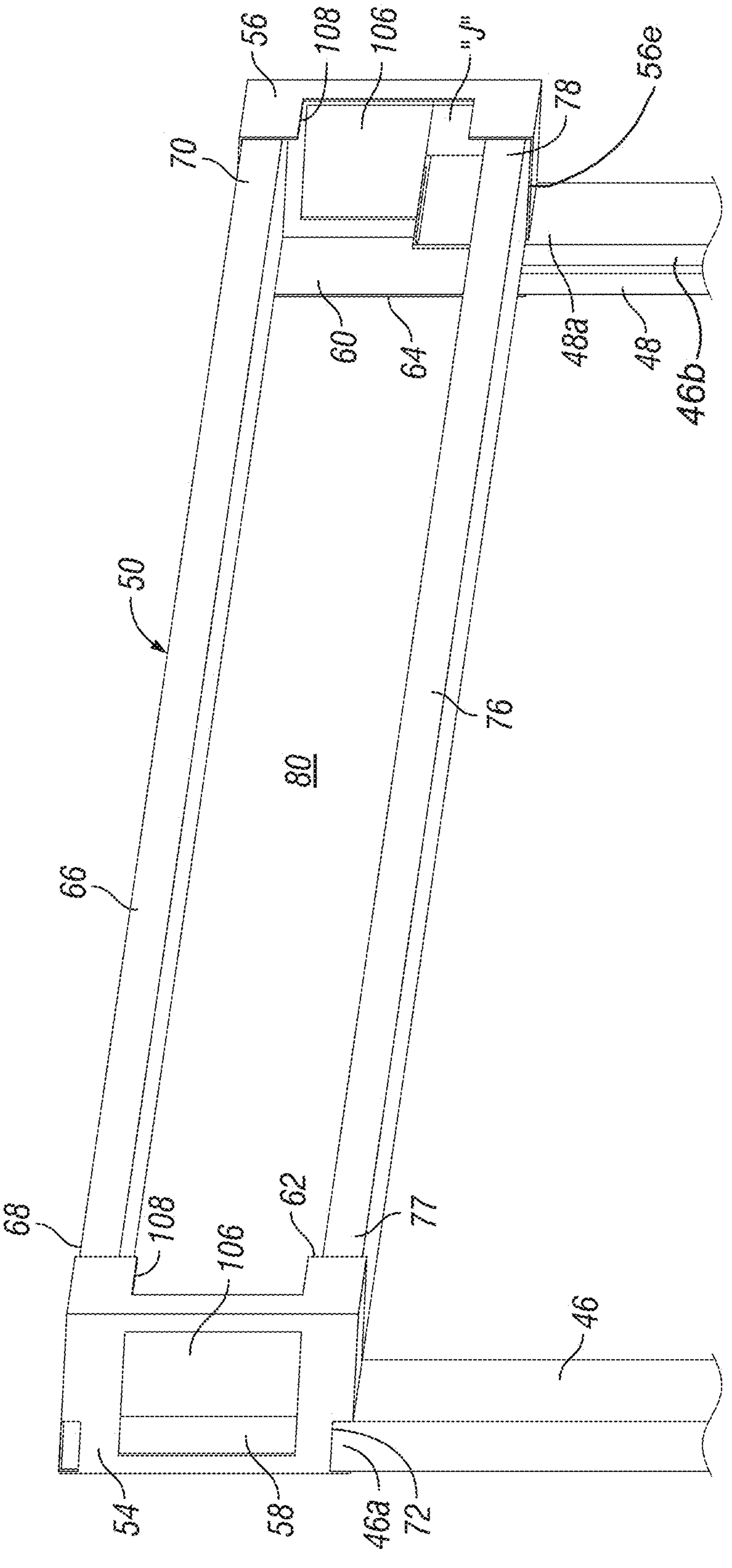
FIG. 5 is an enlarged, fragmented, right perspective view of a header assembly similar to the header assembly shown in FIG. 3, except that a lower brace board or bottom header is included. The surrounding building structure is omitted to simplify the illustration.
Figure 7:
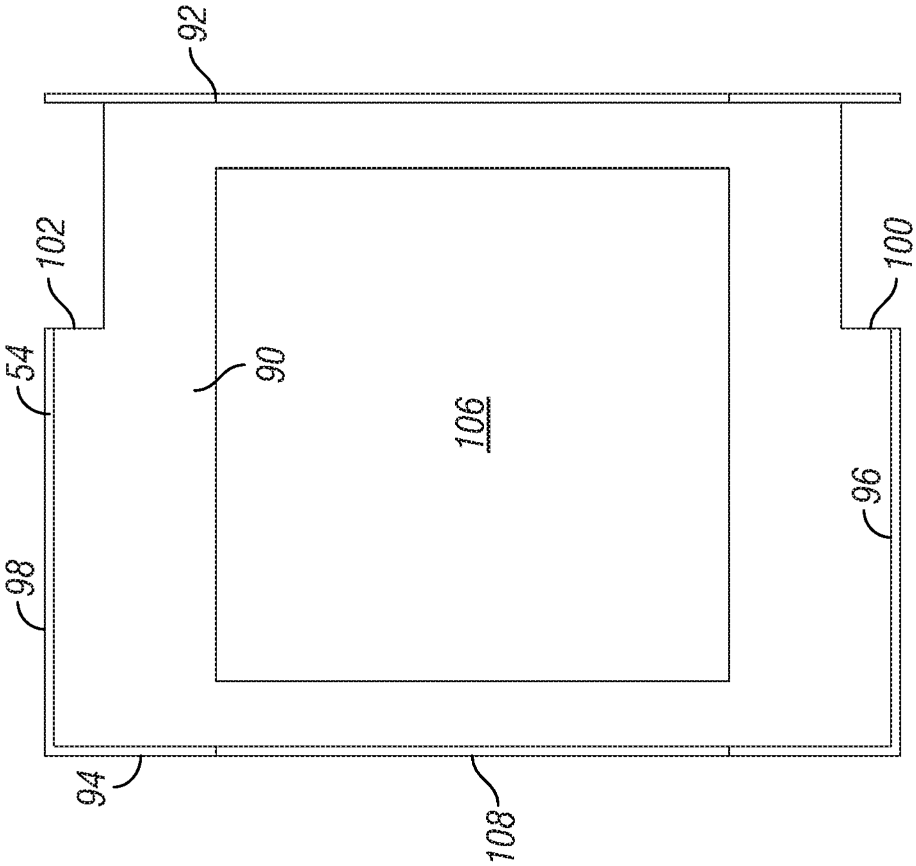
FIG. 7 is an inside elevational view of the end box shown in FIG. 6.
Figure 6:
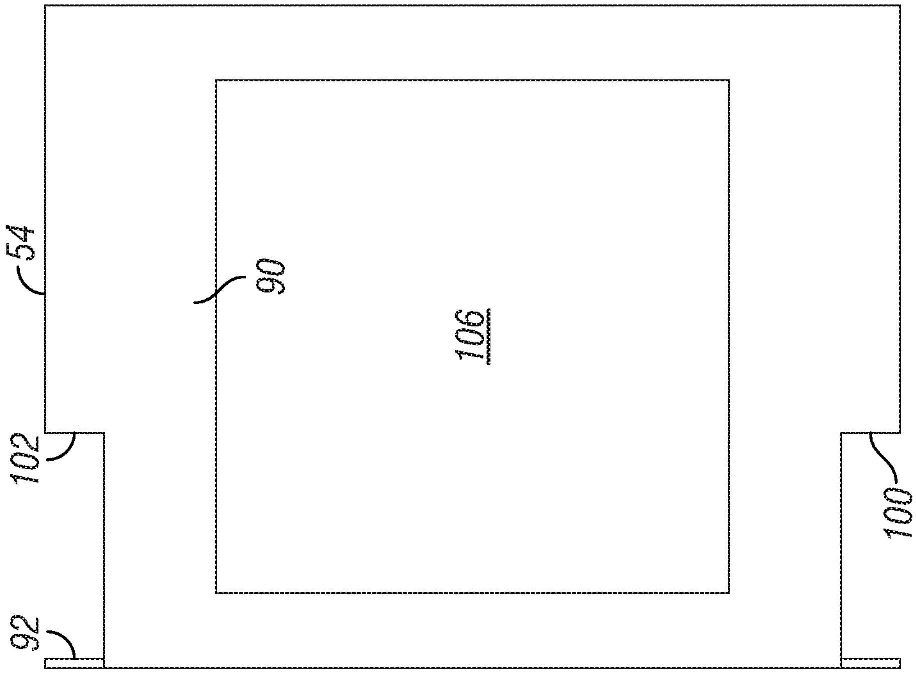
FIG. 6 is an enlarged outside elevational view of the vertical end wall of an end box made in accordance with a particularly preferred embodiment of the present invention.

With continuing reference to FIG. 3 and referring now also to FIGS. 4 and 5, a preferred header assembly will be described. The header assembly of the present invention, designated generally by the reference number 50 generally comprises first and second end boxes 54 and 56. Each end box 54 and 56 defines a five-sided recess 58 (FIG. 4) and 60 (FIG. 5), respectively, with a screen receiving opening 62 and 64. As seen in FIG. 3, the recess 58 of the end box 54 is sized to receive the first (or second) end 36 of the screen housing 34 through the screen receiving opening 62.

A top header 66 extends between the end boxes 54 and 56. The header 66 has first and second ends 68 and 70. Each of the first and second ends 68 and 70 is sized to be received inside the recess of the first or second end boxes 54 and 56. Preferably, the top header 66 has a width about the same as the width of the end boxes and is fit inside the upper end of each end box.

The bottom of each end box 54 and 56 has a forwardmost edge 54*a* and 56*a* and a track receiving opening 72 and 74 sized to receive the upper ends 46*a* and 48*a* of the first and second side tracks 46 and 48 of the screen unit 20. The vertical side tracks 46 and 48 are mounted to the building's frame (not shown) with the upper ends 46*a* and 48*a* of the first and second side tracks 46 and 48 received in the track receiving openings 72 and 74. With the screen housing 34 (FIG. 3) mounted between the end boxes 54 and 56, the leading edge 40 of the panel 30 may be inserted into the side tracks.

In some installations, all or part of the header assembly 50 is exposed after surrounding wall surfaces have been applied. In such cases, the header assembly 50 may include a second bottom header 76, as seen only in FIG. 5. The first and second ends 77 and 78 of the bottom header 76 are sized to be received in the recesses 58 and 60 of the end boxes 54 and 56, and preferably in the bottom of the end boxes adjacent the upper ends 46*a* and 48*a* of the side tracks 46 and 48 and spaced a distance below the upper header 66.

Now it will be apparent that the assembled header assembly 50 and screen unit side tracks 46 and 48 define a custom screen cavity 80 in the structure's frame about which the wall surfaces 12 may be installed. More specifically, the tops of the end boxes 54 and 56 and the top header 66 form the uppermost boundary of the screen cavity 80, and the ends of the end boxes and the side tracks 46 and 48 form the sides of the cavity. With these fixed structures in place, the builder's workers can simply apply the wall finishes around them. Now it will be understood that in the assembled header assembly 50 the space between the first and second end boxes 54 and 56 and below the top header 66 (and above the bottom header 76 when it is included) defines the access opening 22 in the finished wall 12, as seen FIG. 2.

Turning now to FIGS. 6-11, a particularly preferred structure for the end boxes 54 and 56 will be explained. In the preferred embodiment of the present invention, the end boxes 54 and 56 are identical and reversible, that is, each end box is formed so that it can be used on either end of the header assembly 50. Thus, only one of the end boxes, namely the end box 54, will be shown and described in detail.

As mentioned previously, the end box 54 is defined by five sides which defines an end box recess 58 (FIG. 4) with a screen receiving opening 62. The five sides include a vertical end wall 90 which is opposite the screen receiving opening 62. Also included are a back wall 92 and a front wall 94 opposite of and parallel to the back wall. Still further, the sides include a first side wall 96 and a second side wall 98 opposite of and parallel to the first side wall. The back wall 92, front wall 94, and first and second side walls 96 and 98 all are perpendicular to the vertical end wall 90. As used herein, "front" refers to the aspect of the assembly seen from inside the building, that is, the aspect shown in FIGS. 3-5, for example. "Back," as used herein, refers to the side of the header assembly facing toward the outside of the building, that is, the side opposite the side shown in FIGS. 3-5, for example. "Vertical," as used herein refers to plan perpendicular to the floor or supporting platform of the building structure.

The first side wall 96 defines a first track receiving opening 100 sized to receive the upper end 46*a* or 48*a* of the first or second side tracks 46 or 48 when the end box 54 is positioned with the first side wall as the bottom of the recess 58. Similarly, the second side wall 98 defines a second track receiving opening 102 sized to receive the upper end 46*a* or 48*a* of the first or second side tracks 46 or 48 when the end box 54 is positioned with the second side wall as the bottom of the recess 58.

A portion of the vertical end wall 90 may be removed to form an end window 106. This reduces the weight of the end box. Additionally, it may simplify attachment of the electrical junction box "J" (see FIG. 4) inside the end box. A portion of the front wall 94 preferably is cut away to form a large notch 108, as this will facilitate positioning of the screen unit housing 34 (FIG. 3) inside the header assembly 50.

The end boxes may be formed of metal, such as galvanized steel. For example, a blank may be stamped or cut to have the openings as described and then folded into the five-sided shape. Still further, the end boxes may be molded of plastic or a composite material.

Figure 12:
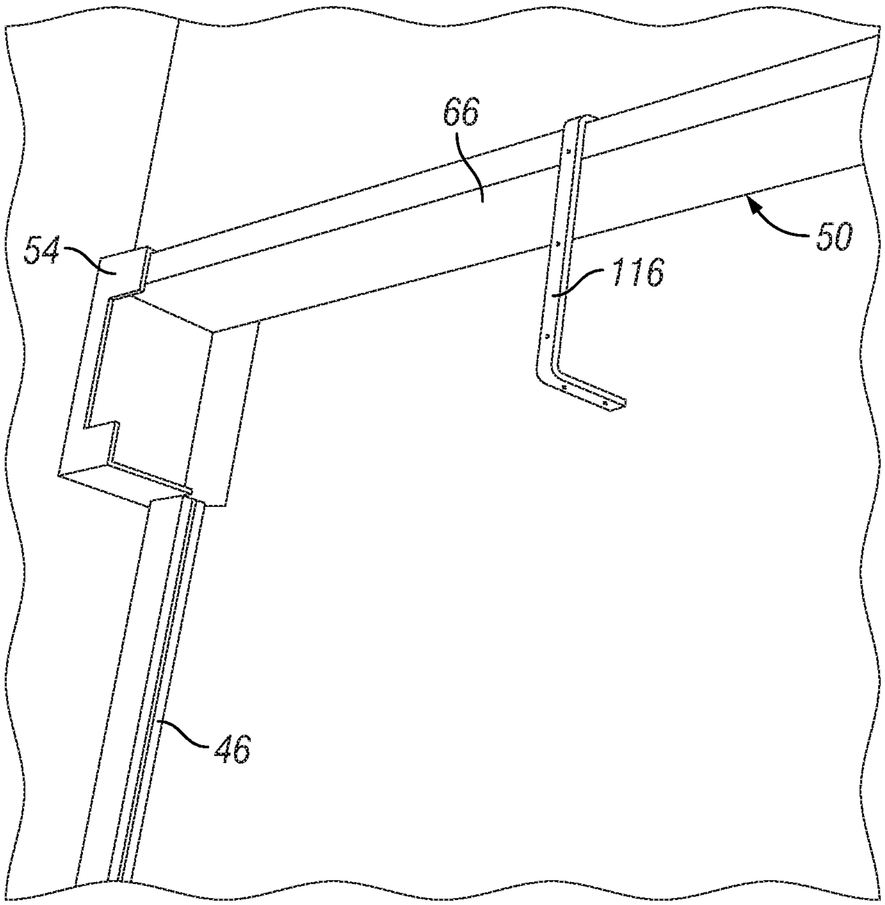
FIG. 12 is a fragmented, enlarged, inside perspective view of the installed header assembly with two of the panel brackets hung on the upper brace board, illustrating how the brackets support an attached cover panel (omitted here for clarity) over an exposed header assembly access opening.
Figure 13:
FIG. 13 is a front elevational view of a cover panel assembly.
Figure 14:
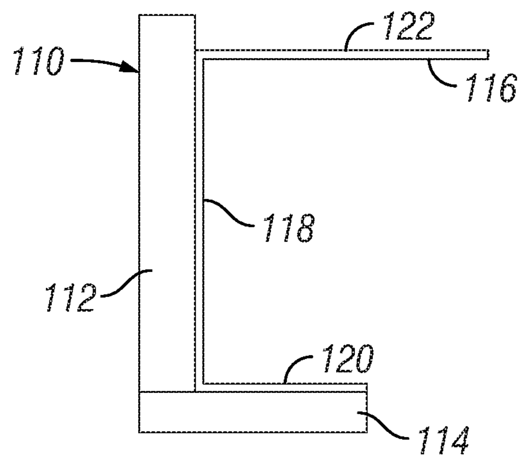
FIG. 14 is an end elevational view of the cover panel assembly shown in FIG. 13.
Figure 15:
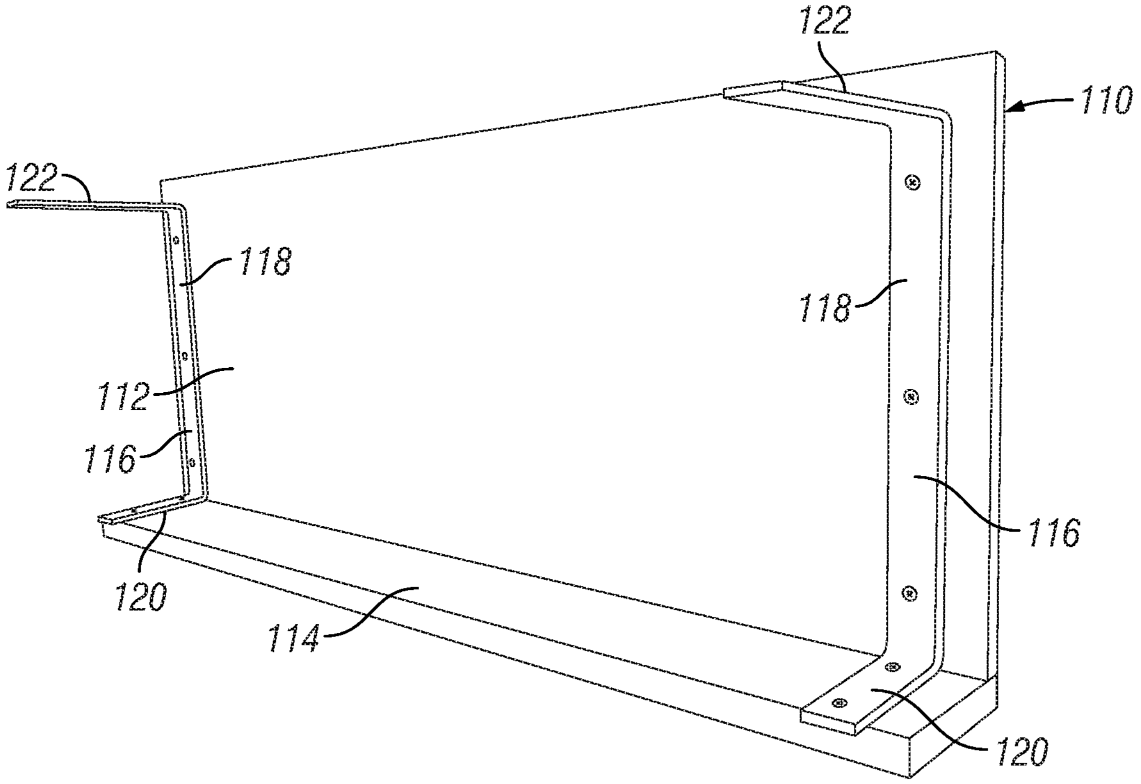
FIG. 15 is a right side perspective view of the cover panel assembly.
Figure 16:
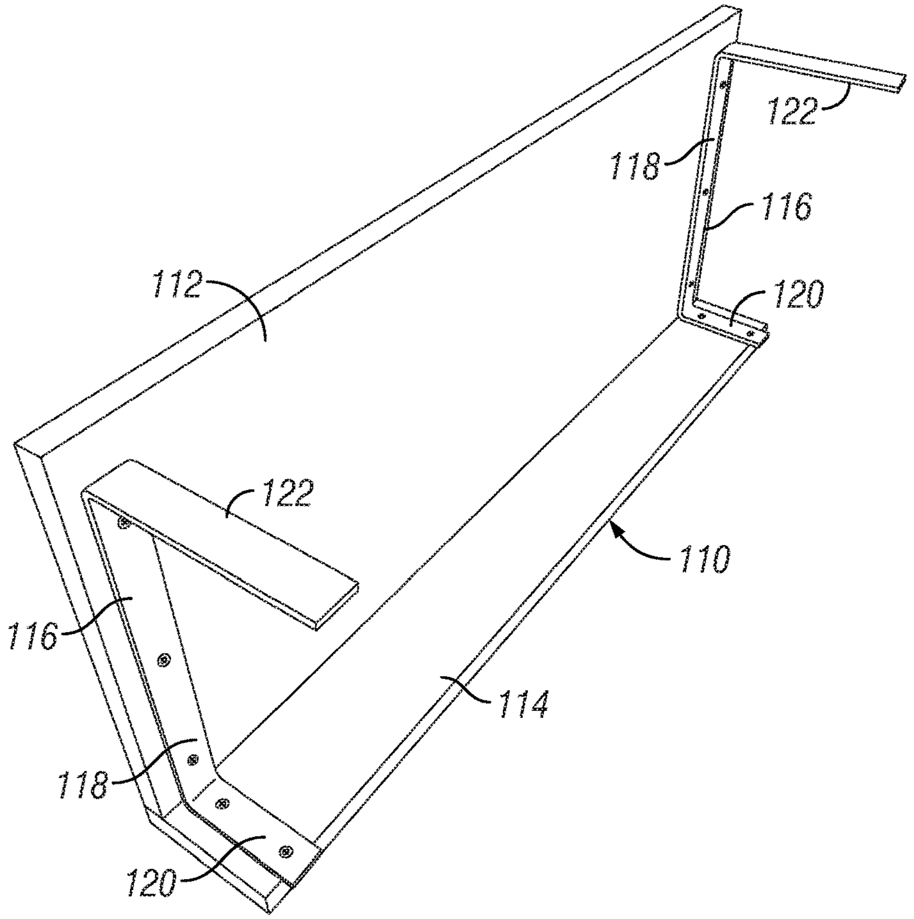
FIG. 16 is a left side perspective view of the cover panel assembly.
Figure 17:
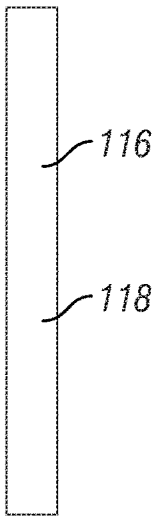
FIG. 17 is a front elevational view of the bracket for the cover panel assembly.
Figure 18:
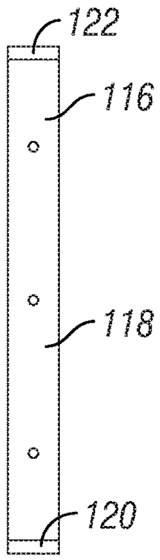
FIG. 18 is an inside elevational view of the bracket.
Figure 19:
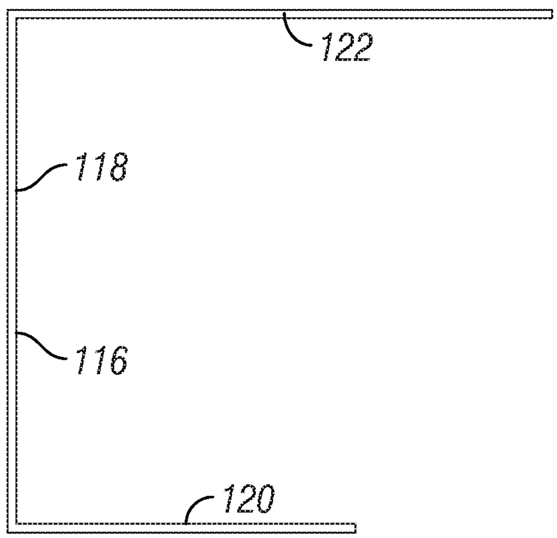
FIG. 19 is a right end elevational view of the bracket.
Figure 20:
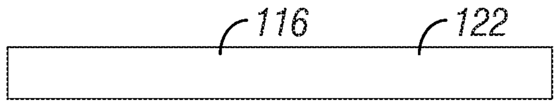
FIG. 20 is a plan view of the bracket.
Figure 21:
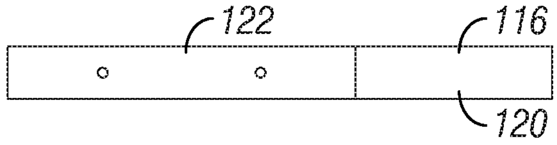
FIG. 21 is a bottom view of the bracket

The access opening 22 (FIG. 2) may be provided with a removable cover. An exemplary cover is shown in FIGS. 12-21 to which attention now is directed. The cover, designated generally at 110 may comprise a front panel 112 and in some cases a bottom panel 114 supported on one or more brackets 116. As shown, the cover panels 112 and 114 are simply boards or other panel material sized to be coextensive with the opening 22. The bracket 116 may be a C-shaped bar having a front section 118 for attachment of the front panel 112, a bottom section 120 for attachment of the bottom panel 114, and a top section 122 sized to hang on the top header 66, as seen best in FIG. 12. The number and relative positions of the brackets 116 may vary. Only one is shown in FIG. 12 to simplify the illustration. Thus, the assembled cover 110 easily may be placed over and removed from the access opening 22.

The header assembly may be made and sold independently of the screen unit. For example, universal end boxes may be made in one or more standard sizes to fit a number of different brands of screen units. Alternately, a screen kit may be provided that includes the screen unit (screen panel, housing, and side tracks, etc.) along with end boxes made specifically for that screen unit. The upper and lower headers may or may not be included, as these are easily made on site of standard board lumber. A cover for the access opening may be included. Or, the kit may include brackets for a cover to be made of lumber on site.

Having described the inventive header assembly, the method of the present invention now will be described. First, a screen unit is selected by the builder, designer or architect. Next, the dimensions of the selected screen unit are determined, and the components of the header assembly are selected and sized.

After the builder has constructed the building frame and prior to the application of the surrounding wall surfaces, the screen installer will assemble and install the header assembly. This includes installing the first and second end boxes and securing the top header and, if needed, the bottom header. The side tracks form the selected screen unit are obtained and secured to the building frame so that one end of each of the side tracks opens into the track receiving opening in the bottom of one of the end boxes. Thus, the custom screen cavity is created in the building frame. After the builder has applied the wall surfaces around the custom screen cavity, the selected screen unit is installed inside the custom screen cavity. Then, if desired, a cover panel is placed over the access opening.

Now it will be appreciated that the header assembly and method of the present invention greatly simplifies the installation of built-in retractable screens. In accordance with the assembly and method of the present invention, a custom header assembly and the screen unit's side tracks are installed in the wall of the structure after the builder has constructed the building frame and prior to the application of the wall surfaces. Then, the builder applies the wall surfaces, such as masonry, wood, stucco, and the like. The wall finishes are applied over and around the fixed header assembly and side tracks, leaving open only an access opening for servicing the installed screen unit. In this way, the builder and his workmen are freed of the need to build around a void by repeatedly, and sometimes inaccurately, measuring.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A structure comprising:

an internal frame defining a wall having an inside and an outside and with a screen opening;

a screen unit comprising a retractable screen panel deployable from a roll, the roll of the screen unit having first and second ends, the screen panel having first and second side edges and a leading bottom edge, the screen unit including first and second side tracks, each of the first and second side tracks having an upper end and a forwardmost surface defining a slot to receive the first and second side edges of the screen panel when the screen unit is installed in the structure;

a header assembly installed in the wall of the internal frame above the screen opening, the header assembly comprising:

first and second end boxes, each end box defining a recess with a screen receiving opening, the recess sized to receive one of the first and second ends of the screen roll through the screen receiving opening, wherein each of the first and second end boxes comprises:

a vertical end wall opposite the screen receiving opening;

a first side wall perpendicular to the vertical end wall and having a forwardmost edge partially defining the screen receiving opening and having a first track receiving opening sized to receive the upper end of one of the first and second side tracks of the screen unit when the end box is positioned with the first side wall as the bottom of the recess; and an top header extending between the first and second end boxes above the screen roll; and a removable cover depending from the top header in front of the screen roll;

a wall surface applied over the internal frame around the screen opening and over the first and second end boxes of the header assembly;

wherein a space between the first and second end boxes defines an access opening through which the screen roll of the screen unit can be inserted and removed; and wherein the assembled header assembly and screen unit's side tracks define a screen cavity in the structure's internal frame about which the wall surfaces are installed.

2. The structure of claim 1 wherein each of the first and second end boxes further comprises a second side wall opposite the first side wall and wherein the second side wall has a second track receiving opening sized to receive the upper end of one of the first and second side tracks of the screen unit when the end box is positioned with the second side wall as the bottom of the recess.

3. The structure of claim 1 wherein each of the first and second end boxes further comprises a front wall.

4. The structure of claim 3 wherein the front wall of each of the first and second end boxes includes a notch to facilitate positioning of the screen unit in the installed header assembly.

5. The structure of claim 1 further comprising a second bottom header extending between the first or second end box.

6. The structure of claim 5 wherein the screen cavity has an uppermost boundary and wherein the top header has a width and is adapted to form the uppermost boundary of the screen cavity, and wherein the second bottom header extends between the first and second end boxes.

7. The structure of claim 1 wherein the first and second end boxes are sized to accommodate an electrical junction box for supplying electricity to the screen unit.

8. The structure of claim 1 wherein each of the first and second end boxes further comprises a front wall and a back wall.

9. The structure of claim 1 wherein each of the first and second end boxes further comprises a top wall, a front wall, and a back wall.

10. A retractable screen kit for installation inside a wall of a structure, the kit comprising:

a retractable screen panel deployable from a screen roll having first and second ends, the screen panel having first and second side edges and a leading bottom edge;

first and second side tracks, wherein each of the first and second side tracks has an upper end and a forwardmost surface defining a vertical slot to receive one of the first and second side edges of the screen panel when the screen unit is installed in the structure; and first and second end boxes, each such end box sized to receive one of the first and second ends of the roll, wherein each of the end boxes has a first side wall and each first side wall of each end box forming a bottom with a track receiving opening sized to receive the upper end of one of the first and second side tracks, each end box being configured for installation inside the wall of the structure;

an top header sized to extend between the first and second end boxes above the screen roll when the first and second end boxes are installed in the wall of the structure; and a removable cover configured to depend from the top header in front of the screen roll when the first and second end boxes and the top header are installed in the wall of the structure.

11. The retractable screen kit of claim 10 further comprising a second bottom header, the second bottom header sized to extend between the first and second end boxes when the first and second end boxes and the top header are installed in the wall of the structure.

12. The retractable screen kit of claim 10 wherein the first and second end boxes form a header assembly, wherein in the assembled header assembly a space between the first and second end boxes defines an access opening through which the roll of the screen unit can be inserted and removed.

* * * * *